United States Patent [19]

Zidek

[11] Patent Number: 5,097,785
[45] Date of Patent: Mar. 24, 1992

[54] MARINE BUMPER

[76] Inventor: Charles E. Zidek, 708 Gateway Dr., Prospect Heights, Ill. 60070

[21] Appl. No.: 493,391

[22] Filed: Mar. 14, 1990

[51] Int. Cl.⁵ .............................................. B63B 59/02
[52] U.S. Cl. ...................................... 114/219; 211/23; 405/212
[58] Field of Search ..................... 114/219, 220; 405/212-215; 14/76; 211/23, 24; 224/42.06; 248/304, 309.1; 293/102, 143

[56] References Cited

U.S. PATENT DOCUMENTS

| | | | |
|---|---|---|---|
| 2,733,881 | 2/1956 | Threlfall et al. | 211/24 X |
| 2,842,085 | 7/1958 | Norman | 114/219 |
| 2,952,979 | 9/1960 | Rolando | 114/220 X |
| 3,298,121 | 1/1967 | Wathen | 211/24 X |
| 4,022,452 | 5/1977 | Dupre | 114/219 X |
| 4,378,749 | 4/1983 | Leblanc et al. | 114/220 |
| 4,573,587 | 3/1986 | Matthews, Jr. | 211/24 |

Primary Examiner—Ed Swinehart
Attorney, Agent, or Firm—John J. Kowalik

[57] ABSTRACT

A hanger assembly for a tire bumper comprising inner and outer legs which define a slot for receiving a tire side wall, one leg having a clinching rib formed thereon for clinching with the bead of the tire and the other leg extending radially into the tire carcass between its side walls and having a seating position formed thereon for seating against the interior of the tire along complementary surfaces in radial alignment with the thread portion of the tire, the outer leg having an aperture for receiving a securing element attachable to a mooring pier for holding the tire thereon.

16 Claims, 1 Drawing Sheet

MARINE BUMPER

BACKGROUND OF THE INVENTION

This invention relates to marine bumpers which utilizes old vehicle tires and are mounted on a mooring pier.

It is a common practice to hang old tires about the edges of a pier. Invariably the side wall of a tire is punctured and the tire is hung from a nail passing through the puncture. The hole made in the tire quickly enlarges, because of the tire being bumped by a vessel which causes displacement of the tire and tearing at the hole. Continuous wave action also pounds on the tire which also causes it to tear. Some mountings secure the tire to the pier through the hole, which is an improvement, but it also is subject to eventinal tear and wear.

SUMMARY OF THE INVENTION

This invention relates to a mounting stucture for a tire which is adapted to serve as a marine bumper.

A general object is to provide a novel mounting which extends the durability of the tire.

A more specific object is to provide a bumper mounting which does not require puncturing of the tire.

A different object is to provide a hanger assembly which interlocks with the bead of the tire and which supports the tire in its areas of greatest strength.

The invention contemplates providing hangers each of which comprises a pair of legs forming a vertical slot which adjusts the side wall of the tire therein, one leg extending into the tire and the other leg extending alongside the exterior of the side wall whereby the legs clamp the side wall of the tire therebetween.

The invention also provides a clinching offset on one of the legs of the hanger which snaps about the rim or bead of the tire and releasably grasps it secured to the hanger.

A still further object is to provide a hanger having inner and outer legs, the inner leg extending within the tire and having a upper end curved to conform to the U-shaped cross-section of the tire and providing a broad seat for the tire within the carcass so as to minimize wear.

A further object is to provide a seat on the hanger which supports the tire in its thread area which is the strongest part thereof.

These and other objects and advantages inherent in and encompassed by the invention will become more apparent from the specification and the drawings, wherein.

DESCRIPTION OF THE INVENTION

Figure 1:
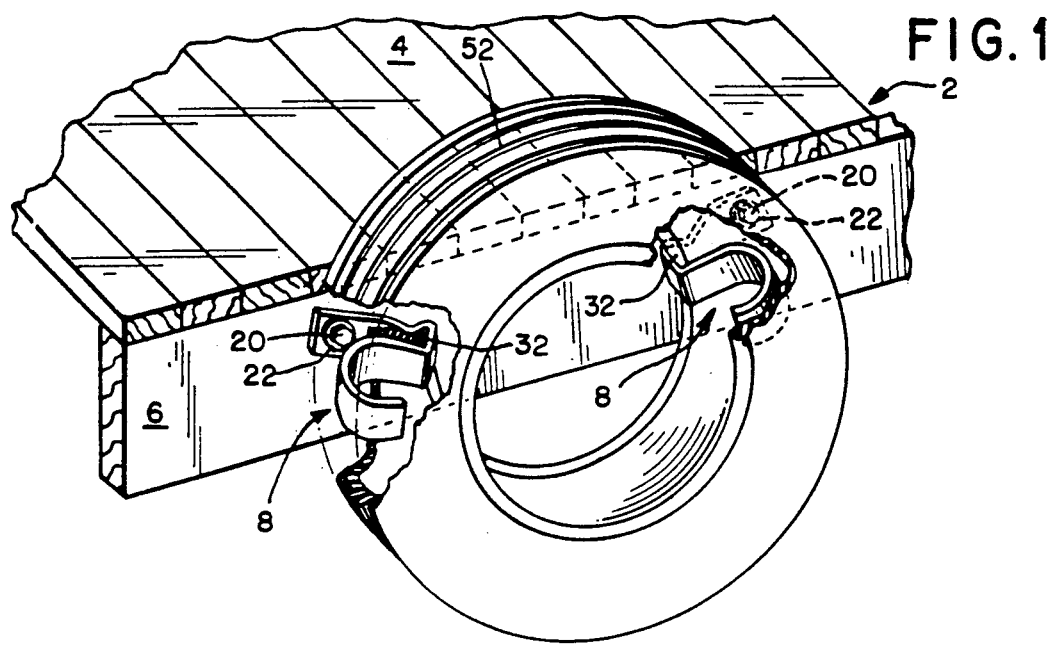
FIG. 1 is a perspective view of the bumper and hanger assembly as mounted to a pier.
Figure 5:
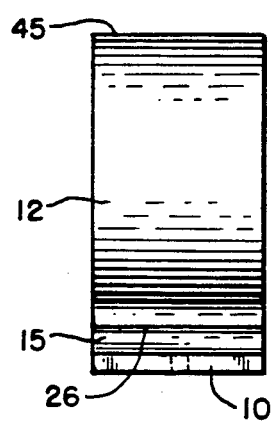
FIG. 5 is a top end view of the hanger.
Figure 3:
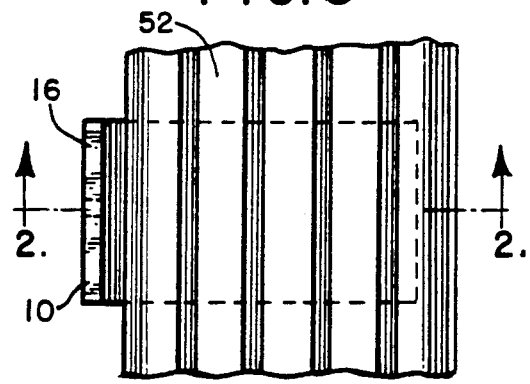
FIG. 3 is a fragmentary elevational view showing the tire edge.
Figure 4:
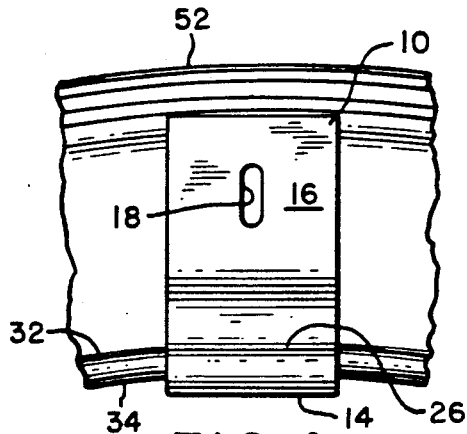
FIG. 4 is a fragmentary side elevational view of a hanger and tire assembly.

The invention is shown in FIG. 1 in association with a wharf or pier 2 comprising a deck 4 and a facia edging 6.

Attached to the facia are two hangers 8, 8. Each hanger comprises of jaw having an outer leg or jaw portion 10 and an inner leg or jaw portion 12 joined by bight 14 which develop a vertical slot 15 open at its upper end.

The outer leg 10 has a flat upper end portion 16, with an aperture 18 therein for receiving a screw shank of a screw 20 therethrough which is threaded into the facia board. The screw has a bead 22 which bears against the internal side 24 of the leg portion 16 and draws the hanger or clamp leg portion 16 tightly against the facia.

The lower end position 25 of the outer leg 10 has a clinching portion or ridge forming interlocking means 26 offset into the slot and forming with the bight portion 14 at the lower end of the outer leg a pocket 30 which admits the bead or interlocking means 32 formed on the inner edge 34 of the tire which, being made of resilient material, is tightly compressed into the pocket. The inner side 36 of the side wall is engaged by the outer surface 38 of the inner leg 40 of the hanger. The inner edge portion of the side wall of the tire is tightly squeezed by the respective portions of the legs of the hanger and held it in place. The inner leg of the hanger has an uppers extension 42 which lays against the inner face 44 of the respective side wall of the tire.

The upper end portion 45 of the inner leg has a curved seat 48 which is shaped complementary to the carcass areas 50 of the tire comprising primarily the strong thread portion 52 of the tire. The upper seat section 48 has an outer extension 54 projecting downwardly along the inner face 56 of the the outer side wall 58 of the tire.

Figure 2:
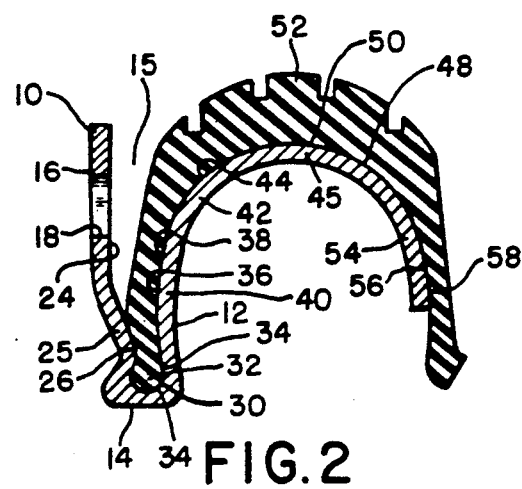
FIG. 2 is a cross-section taken on line 2—2 of FIG. 3.

It will be noted or seen in FIGS. 1 2 hanger are used positioned circumferentially of the tire and together they form a mounting for the tire and permit flexing of the walls of the tire.

The legs of each hanger member in the assembled position with the tire carcass extend radially of the associated sidewall.

I claim:

1. A bumper for protecting a boat moored to a pier comprising;
   hanger members having inner and outer legs and an interconnecting bight defining a slot therebetween for admitting a side wall portion of a tire having a peripheral bead,
   said outer leg having a clinching offset adjacent to the bight for locking said peripheral bead of the tire to the hanger members,
   a means for securing the outer leg of each hanger member to a pier, and said tire secured to said pier by said hanger members.

2. The invention according to claim 1, and
   said inner leg having an upper end with a curved portion for complemental fit into the interior portion of the tire in radial alignment with the tread of the tire.

3. The invention according to claim 1, and
   said legs clampingly embracing the side wall of said tire therebetween.

4. The invention according to claim 1, and wherein said tire has a cavity therein and
   said inner leg having an upper portion curved to complementaly fit within said tire cavity.

5. The invention according to claim 4, and
   said upper portion extending away from said outer leg and providing a cantilever support for the tire.

6. The invention according to claim 5, and
   said hanger members being spaced apart circumferentially within the tire.

7. The invention according to claim 1, and said legs being resilient and biased toward each other.

8. The invention according to claim 1, and
said inner leg having a seating portion complemental to the cavity in the tire.

9. A holder for a tire carcass having a pair of side walls each having interlocking means thereon, said holder comprising a jaw having opposed jaw portions adapted to grasp one of said side walls of the carcass therebetween and extending radially of the tire carcass, means on said one jaw portion for interlocking engagement with said interlocking means on said one side wall, and means on one of said jaw portions for attachment to a pier.

10. The invention according to claim 9, and
said interlocking means on said one of said side walls comprising beads thereon, and said means for interlocking having clinching engagement with a bead on one of said side walls.

11. The invention according to claim 10, and
one of said jaw portions having a curved end section for complementally seating against the interior of the carcass.

12. The invention according to claim 11, and
said end section having a portion extending alongside the other of said sidewalls of the carcass.

13. The invention according to claim 9, and
said jaw portions having a juncture to each other at one end and said means for interlocking engagement comprising an offset rib on one of said jaw portions and said interlocking means of one side wall of the carcass overlapped by said offset rib.

14. The invention according to claim 9, and
said jaw having inner and outer portions and said outer portion comprising an essentially flat mounting section for attachment to a pier.

15. The invention according to claim 9, and
said opposing jaw portions being resilient portions.

16. The invention according to claim 15, and
said jaw portions being interconnected by a bight portion and said one of said jaw portions together with said means for interlocking engagement forming a pocket with the bight portion for receiving a side wall bead therein.

* * * * *